United States Patent
Song et al.

(10) Patent No.: US 11,842,458 B2
(45) Date of Patent: *Dec. 12, 2023

(54) IMAGE FEATURE COMBINATION FOR IMAGE-BASED OBJECT RECOGNITION

(71) Applicant: Nant Holdings IP, LLC, Culver City, CA (US)

(72) Inventors: Bing Song, La Canada, CA (US); Liwen Lin, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,560

(22) Filed: Dec. 15, 2022

(65) Prior Publication Data

US 2023/0123624 A1 Apr. 20, 2023

Related U.S. Application Data

(60) Continuation of application No. 17/008,434, filed on Aug. 31, 2020, now Pat. No. 11,551,329, which is a
(Continued)

(51) Int. Cl.
*G06T 3/00* (2006.01)
*G06F 16/583* (2019.01)
(Continued)

(52) U.S. Cl.
CPC .......... *G06T 3/0056* (2013.01); *G06F 16/583* (2019.01); *G06F 18/253* (2023.01);
(Continued)

(58) Field of Classification Search
CPC ...... G06F 16/583; G06F 18/253; G06T 11/60; G06T 2200/28; G06T 3/0056; G06V 10/462; G06V 10/806
See application file for complete search history.

(56) References Cited

U.S. PATENT DOCUMENTS 6,526,156 B1 2/2003 Black et al.
6,711,293 B1 3/2004 Lowe
(Continued)

FOREIGN PATENT DOCUMENTS

CN 102693542 A 9/2012
EP 2 138 978 A2 12/2009
(Continued)

OTHER PUBLICATIONS

Chum et al., "Locally Optimized RANSAC," Pattern Recognition, Springer Berlin Heidelberg, vol. 2781, 2003, 8 pages.
(Continued)

*Primary Examiner* — Manuchehr Rahmjoo
(74) *Attorney, Agent, or Firm* — Mauriel Kapouytian Woods LLP; Andrew A. Noble

(57) ABSTRACT

Methods, systems, and articles of manufacture to improve image recognition searching are disclosed. In some embodiments, a first document image of a known object is used to generate one or more other document images of the same object by applying one or more techniques for synthetically generating images. The synthetically generated images correspond to different variations in conditions under which a potential query image might be captured. Extracted features from an initial image of a known object and features extracted from the one or more synthetically generated images are stored, along with their locations, as part of a common model of the known object. In other embodiments, image recognition search effectiveness is improved by transforming the location of features of multiple images of a same known object into a common coordinate system. This can enhance the accuracy of certain aspects of existing image search/recognition techniques including, for example, geometric verification.

15 Claims, 6 Drawing Sheets

Related U.S. Application Data division of application No. 15/452,644, filed on Mar. 7, 2017, now Pat. No. 10,861,129.

(60) Provisional application No. 62/305,525, filed on Mar. 8, 2016.

(51) Int. Cl.
  *G06T 11/60* (2006.01)
  *G06V 10/46* (2022.01)
  *G06F 18/25* (2023.01)
  *G06V 10/80* (2022.01)

(52) U.S. Cl.
  CPC ............ *G06T 11/60* (2013.01); *G06V 10/462* (2022.01); *G06V 10/806* (2022.01); *G06T 2200/28* (2013.01)

(56) References Cited

U.S. PATENT DOCUMENTS

| | | | |
|---|---|---|---|
| 9,558,426 | B2 | 1/2017 | Song et al. |
| 10,268,950 | B2 | 4/2019 | Yin et al. |
| 10,331,970 | B2 | 6/2019 | Song et al. |
| 10,719,731 | B2 | 7/2020 | Song et al. |
| 11,551,329 | B2 | 1/2023 | Song et al. |
| 2009/0116749 | A1 | 5/2009 | Cristinacce et al. |
| 2009/0161962 | A1 | 6/2009 | Gallagher et al. |
| 2009/0297048 | A1 | 12/2009 | Slotine et al. |
| 2011/0038545 | A1 | 2/2011 | Bober et al. |
| 2011/0286627 | A1 | 11/2011 | Takacs et al. |
| 2011/0299770 | A1 | 12/2011 | Vaddadi et al. |
| 2011/0299782 | A1 | 12/2011 | Hamsici et al. |
| 2012/0170834 | A1 | 7/2012 | Wang et al. |
| 2012/0170835 | A1 | 7/2012 | Wang et al. |
| 2013/0279751 | A1 | 10/2013 | Bruna et al. |
| 2013/0322763 | A1 | 12/2013 | Heu et al. |
| 2014/0185924 | A1 | 7/2014 | Cao et al. |
| 2015/0023602 | A1 | 1/2015 | Wnuk et al. |
| 2015/0054824 | A1 | 2/2015 | Jiang |
| 2015/0207960 | A1 | 7/2015 | Tomlinson et al. |
| 2015/0254510 | A1 | 9/2015 | McKinnon et al. |
| 2015/0287228 | A1 | 10/2015 | Moraleda et al. |
| 2015/0294189 | A1 | 10/2015 | Benhimane et al. |
| 2017/0263019 | A1 | 9/2017 | Song et al. |
| 2018/0239784 | A1* | 8/2018 | Solli .................. G06F 18/22 |

FOREIGN PATENT DOCUMENTS

| | | | |
|---|---|---|---|
| JP | 2010079545 | A | 4/2010 |
| JP | 2011053823 | A | 3/2011 |
| JP | 2013097467 | A | 5/2013 |
| WO | 2011/069021 | A2 | 6/2011 |

OTHER PUBLICATIONS

Li et al., "Worldwide Pose Estimation using 3D Point Clouds," Computer Vision—ECCV 2012, Springer Berlin Heidelberg, 14 pages.

Turcot et al., "Better Matching with Fewer Features: The selection of Useful Features in Large Database Recognition Problems," 2009 IEEE 12th International Conference on Computer Vision Workshops (ICCV Workshops), 8 pages.

Lowe, "Distinctive Image Features from Scale-Invariant Keypoints," International Journal of Computer Vision, vol. 60, Issue 2, Nov. 2004, pp. 91-110.

International Search Report and Written Opinion in International Application No. PCT/US2015/027655 dated Jul. 29, 2015, 13 pages.

Shih et al., "Data Driven Hallucination of Different Times of day from a Single Outdoor Photo," ACM Transactions on Graphics (TOG)—Proceedings of ACM SIGGRAPH Asia 2013, vol. 32, Issue 6, Nov. 2013, Article No. 200, 50 pages.

Chen et al., "Using image synthesis for multi-channel registration of different image modalities," Medical Imaging 2015: Image Processing, SPIE, 10 pages.

Vemulapalli et al., "Unsupervised Cross-modal Synthesis of Subject-specific Scans," 2015 IEEE International Conference on Computer Vision (ICCV), pp. 630-638.

Zhang, "Adobe Shows Off Features of Changing Time of Day Lighting and Removing Fog," http://petapixel.com/2014/10/10/adobe-shows-features-changing-time-day-lighting-removing-fog, Oct. 10, 2014, 13 pages.

International Search Report and Written Opinion in International Application No. PCT/US2017/021220 dated May 24, 2017, 14 pages.

Office Action issued in Japanese Patent Application No. 2017-507934 dated Jan. 23, 2018, 7 pages.

Yuasa et al., "Keypoint Selection based on Diverse Density for Image Retrieval," Technical report of IEICE. Multimedia and virtual environment, 2013, vol. 112, No. 386, 8 pages.

Yoshida et al., "Robust Planar Pose Estimation by Viewpoint Generative Learning," The Virtual Reality Society of Japan, 2012, vol. 17, No. 3, pp. 191-200.

Office Action issued in Taiwan Patent Application No. 106107643 dated May 9, 2018, 18 pages.

Office Action issued in Canadian Patent Application No. 3,014,670 dated Jun. 25, 2019, 4 pages.

Office Action issued in Chinese Patent Application No. 201680034197.3 dated Nov. 5, 2019, 22 pages.

Office Action issued in Korean Patent Application No. 10-2018-7028888 dated Oct. 6, 2020, 14 pages.

Office Action issued in European Application No. 17 763 938.2 dated Apr. 8, 2021, 6 pages.

Office Action issued in Chinese Application No. 201780015847.9 dated May 24, 2021, 20 pages.

\* cited by examiner

IMAGE FEATURE COMBINATION FOR IMAGE-BASED OBJECT RECOGNITION

CROSS-REFERENCE TO RELATED APPLICATIONS

This application is a continuation of U.S. application Ser. No. 17/008,434 filed on Aug. 31, 2020, which is a divisional application of U.S. application Ser. No. 15/452,644 filed on Mar. 7, 2017, which claims the benefit of U.S. Provisional Patent Application No. 62/305,525 filed on Mar. 8, 2016. The entire contents of these applications are hereby incorporated herein by reference.

BACKGROUND

This disclosure relates generally to image-based object recognition. Various feature detection algorithms are used for image-based object recognition. At the most basic level, feature detection algorithms generate descriptors that provide a means to characterize, summarize and index distinguishing features of an image (e.g., shapes, objects, etc.) for purposes of image-based object recognition, search and retrieval. One example of a feature detection algorithm for image-based object recognition is the Scale Invariant Feature Transform (SIFT) feature detection algorithm, such as described in U.S. Pat. No. 6,711,293 to Lowe. For example, the SIFT feature detection algorithm may be applied to an image to generate descriptors for the numerous features within the image.

Machine-based object recognition generally comprises two distinct steps. First, training images of known objects are analyzed using a feature detection algorithm (e.g., a SIFT feature detection algorithm), which generates descriptors associated with features in the image data. Descriptors associated with many different objects can be packaged as a recognition library or database for deployment on a recognition device (e.g., a smartphone). The image and/or the descriptor data associated with a known object is sometimes reference herein as a "document image." That is simply a label to refer to any image information, such as, for example, feature descriptors, which are associated with a known object. Second, the recognition device captures a new "query" image of an object. The device applies the same image processing algorithm to the query image, thereby generating query image descriptors. The device then compares the query image descriptors to the training image descriptors in the recognition library. If there are sufficient matches, typically nearest neighbor matches, then the query image is considered to contain a representation of at least one of the known objects.

SUMMARY

Although the best recognition algorithms aim to be invariant across one or more image parameters, in practice, calculated feature descriptors do vary based on factors such as lighting, orientation, and other factors. This creates challenges for obtaining accurate, fast recognitions because a query image containing a particular object might have been captured under different conditions than an image of the same object for which image features are stored in an object recognition database. Therefore, the same feature descriptor might have somewhat different values in different images of the same object captured under different conditions. It is known to store different images of the same known object in the same object recognition database, the different images being captured under different conditions, e.g., lighting, orientation, etc. However, the present inventors recognized that it is not necessary to have different captured images of the same object in order to gain the benefits of an object recognition database that reflects a variety of potential capture conditions of the same object. The present inventors recognized that existing techniques for synthetically generating multiple images with variations that correspond to likely real world variations in conditions associated with image capture can be used to populate an object model in an image recognition database.

Therefore, some embodiments of the present invention comprise methods, systems, and articles of manufacture that use a first image of a known object (also referred to herein as a document image) to generate one or more other document images of the same object by applying one or more techniques for synthetically generating images from the first document image. The one or more synthetically generated other document images correspond to different variations in conditions under which a potential query image might be captured. Examples of such variations include, but are not limited to, variations in lighting conditions (for example, as caused by time of day variations and/or weather variations) and vantage point (i.e., image of the same object taken from different perspectives). Some variations may be specific to particular contexts. For example, in the context of medical images, variations in tissue density might affect different images of the same known object. Variations can also include variations in image modality (e.g., X-ray, MRI, CAT scan, ultrasound, etc.). The extracted features from the initial image of the known object and features extracted from the one or more synthetically generated images are stored, along with their locations, as part of a common model of the known object. In a preferred embodiment, locations of features in the synthetically generated document images are expressed in the same coordinate system as are the locations of features in the initial document image from which the synthetic document images are generated without needing to perform a geometric transformation.

The present inventors also recognized that, when two or more independently captured document images of the same known object are available, it is possible to improve image recognition search effectiveness by transforming the location of features of the multiple images into a common coordinate system. Therefore, in other embodiments of the invention, the location of features extracted from multiple captured document images are transformed into a coordinate system associated with one of the multiple document images. The extracted features and their locations in this common coordinate system are stored as part of a model of the known object. This can enhance the accuracy of certain aspects of existing image search/recognition techniques such as, for example, geometric verification.

Various other aspects of the inventive subject matter will become more apparent from the following specification, along with the accompanying drawings in which like numerals represent like components.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Figure 1:
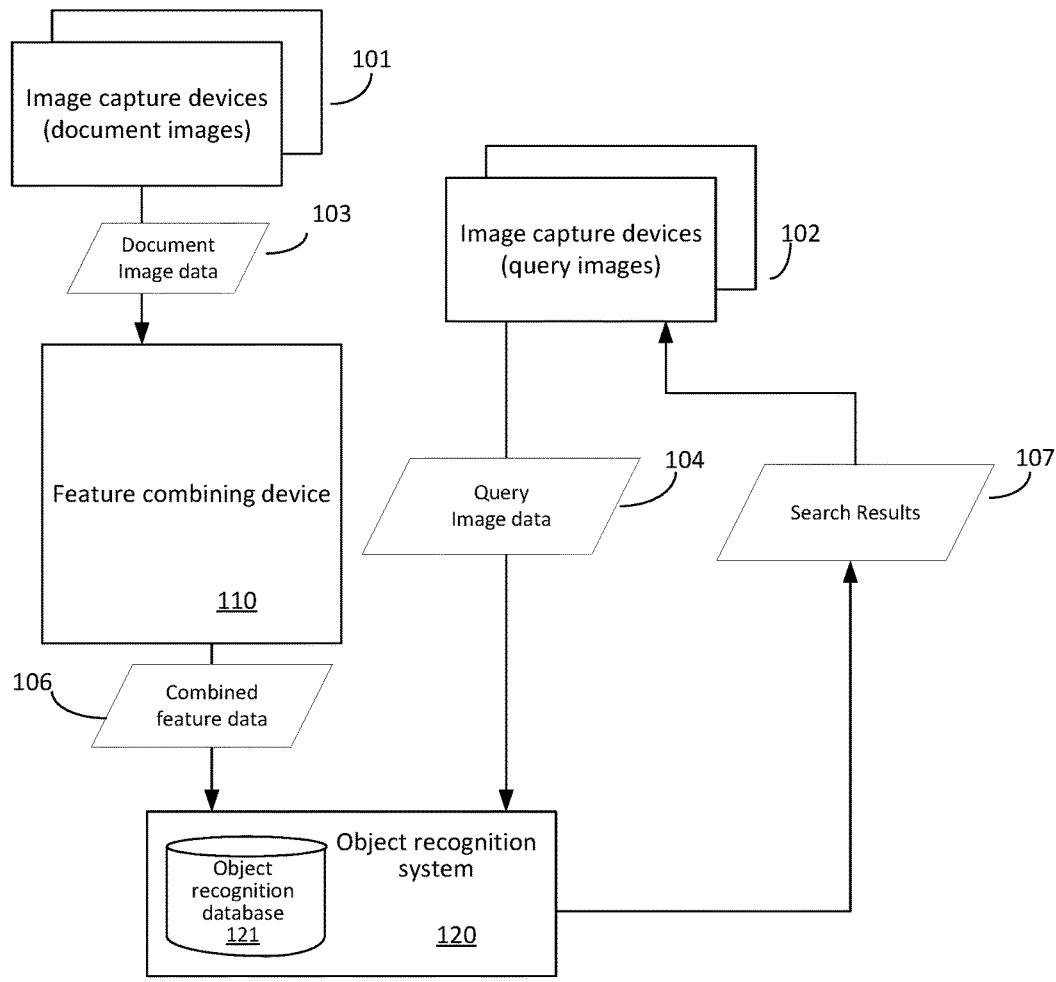
FIG. 1 illustrates feature a combining device in accordance with an embodiment of the invention in the context of an image recognition network.

FIG. 1 illustrates feature combining device 110 in the context of an image recognition network 1000. Document image data 103 is provided by image capture devices 101 to feature combining device 110. Document image data 103 comprises image data, including metadata, of known objects. In some embodiments, document image data comprises a displayable image file along with metadata. However, in other embodiments, the image data may include image data that is derived from a displayable digital image but is not, by itself, usable for displaying the image, such as, for example, descriptors of image features according to one or more algorithms for identifying features usable in image recognition searches.

In some embodiments, document images corresponding to document image data 103 represent two-dimensional (2-D) representations of an object, as may be found in a typical photograph, image, or video frame. Alternatively, the corresponding document image may be a distorted image generated by utilizing atypical filters or lenses (e.g., a fish-eye lens). Moreover, the document image may be a machine or robot-view of an object based on one or more of infrared (IR) filters, X-rays, 360-degree perspective views, etc. As such, the document images corresponding to document image data 103 may be one of an undistorted image, an infrared-filtered image, an X-ray image, a 360-degree view image, a machine-view image, a frame of video data, a graphical rendering and a perspective-view of a three-dimensional object, and may be obtained by capturing a video frame of a video stream via an image capture device, such as one of image capture devices 101.

In some embodiments, one of image capture devices 101 may be a device that is either external (as shown) or internal to feature combining device 110. For example, image capture devices 101 may comprise a remote server (e.g., a Platform-as-a-Service (PaaS) server, an Infrastructure-as-a-Service (IaaS) server, a Software-as-a-Service (SaaS) server, or a cloud-based server), or a remote image database coupled to feature combining device 110 via a communications network. In another example, image capture devices 101 may include a digital still-image or video camera configured to capture images and/or frames of video data. In another example, image capture devices 101 may comprise a graphical rendering engines (e.g., a gaming system, image-rendering software, etc.) where the document image is a generated image of an object rather than a captured image.

Descriptors of image features can be vectors that correspond to one or more distinguishable features of an image (e.g., shapes, objects, etc.) (For efficiency of expression, the term "image feature" as used herein, sometimes implicitly refers to the set of descriptors corresponding to the image feature rather than simply the feature as it appears in a displayable image). There are various methods for detecting image features and generating descriptors. For example, the scale-invariant feature transform (SIFT) is a currently popular image recognition algorithm used to detect and describe features of images. SIFT descriptors are 128 dimensions in order to be highly distinctive (i.e., distinguishable for matching purposes) and at least partially tolerant to variations such as illumination, three-dimensional (3-D) viewpoint, etc. For example, one reference related to generating SIFT descriptors is D. Lowe, "Distinctive Image Features from Scale-Invariant Keypoints", International Journal of Computer Vision 60 (2), pages 91-110 (2004). In addition to SIFT descriptors, other alternative descriptors include Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Energy of image Gradient (EOG) descriptors and Transform Invariant Low-rank Textures (TILT) descriptors.

Feature combining device 110 combines features from different images of the same known object and then stores the combined features as part of a common model for that object. In some embodiments, the different document images from which the features are derived include a first image that is a captured image and one or more second images that are synthetically generated from the captured image, as will be further described herein. In other embodiments, different images from which the features are derived include a first captured image and one or more second independently captured images of the same known object. In some such embodiments, locations of features from the one or more second independently captured images are transformed into a coordinate system of the first captured image using a three dimensional model of the known object, as will be further explain herein. The features (more precisely, descriptors of those features) from different independently captured images of the same object and are then stored, along with feature location information that is referenced to a common coordinate system (e.g., a coordinate system of the first captured image), as combined feature data 106 in object recognition database 121 in object recognition system 120 as part of a common model for the known object.

Image capture devices 102 capture query images and submit query image data 104 to object recognition system 120. Object recognition system 120 uses image feature descriptors in or derived from query image data 102 to search object recognition database to try to identify one or more potential matches for one or more objects in an image captured by image capture devices 102. One or more such potential matches are returned to image capture devices 102 as search results 107. In common alternative implementations, query images data may be submitted from devices other than the device that captures the image.

Figure 2:
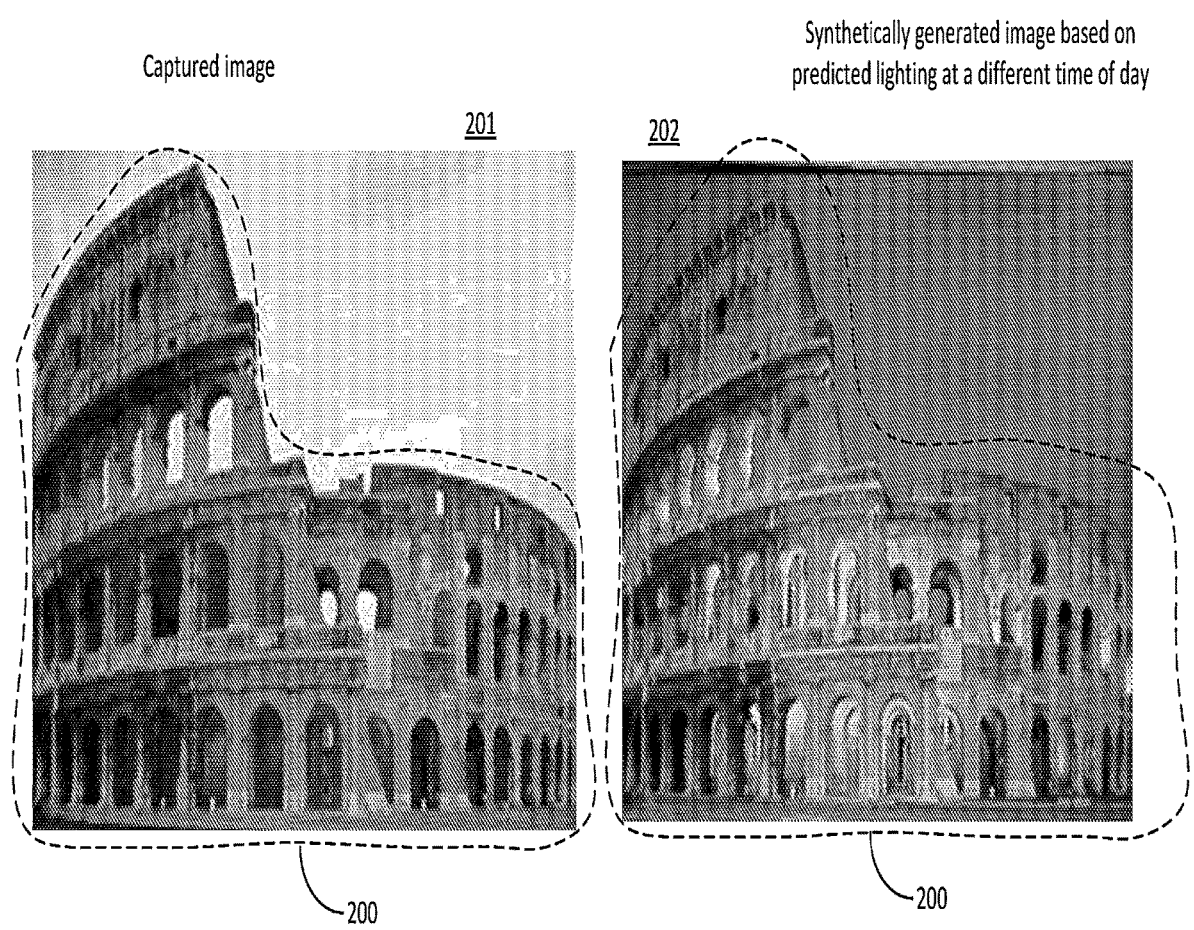
FIG. 2 illustrates a captured first document image and a synthetically generated second document image of a known object.

FIG. 2 illustrates a captured first document image 201 and a synthetically generated second document image 202 of known object 200. Synthetically generated second image 202 is generated from first image 201 by applying an algorithm to image data corresponding to or derived from image 201. The selected algorithm is intended to replicate the effect of predicted variations in conditions under which the image is captured. In the example illustrated in FIG. 2, image 202 represents a prediction of what image 201 would look like if it were taken at a different time of day and therefore taken under different lighting conditions predicted to result from the different time of day. One known algorithm for generating modified images to correspond to different times of day is disclosed in disclosed in "Data Driven Hallucination of Different Times of day from a Single Outdoor Photo" by YiChang Shih, Sylvain Paris, Fred® Durand, and William T. Freeman, published in ACM Transactions on Graphics (TOG)—Proceedings of ACM SIGGRAPH Asia 2013, Volume 32 Issue 6, November 2013 Article No. 200. In the example illustrated in FIG. 2, image 202 of object 200 is obtained by applying an algorithm such as the Shih et al. algorithm to image 201.

Various known algorithms can be used for generating a synthetic image from a captured image, the synthetic image effectively replicating the effect of predicted changes in various image capture conditions. Examples of such variations include, but are not limited to, variations in lighting conditions (for example, as caused by time of day variations and/or weather variations) and vantage point (i.e., image of the same object taken from different perspectives); and variations in image modality, which are particularly relevant in the medical imaging context (e.g., X-ray, MM, CAT scan, ultrasound, etc.). In the medical imaging context, known techniques allow for synthetically generating images in a second modality from an image in a first modality. See, for example, "Using image synthesis for multi-channel registration of different image modalities," Min Chen et al., Proc SPIE Int Soc Opt Eng. 2015 Feb. 21; and "Unsupervised Cross-modal Synthesis of Subject-specific Scans," Raviteja Vemulapalli et al., 2015 IEEE International Conference on Computer Vision (ICCV).

In some embodiments, a subset of a combined feature set can be selected for storage as part of the common object model by, for example, identifying robust features of the combined feature set by determining shared-location features from a first image and one or more synthetic second images (derived using the first image) that have a shared pixel location and selecting only the identified robust features for storage and use in a computerized object recognition search. Identifying robust features can further comprise identifying highly robust features by selecting from the shared-location features, features that are within a predefined distance in a multi-dimensional feature space of a feature detection algorithm used to extract the features from the first image and the one or more synthetic second images. In this embodiment, the identified highly robust features are selected for use in the computerized object recognition search. Identifying and using robust features for more efficient storage and searching is described more fully in co-pending U.S. patent application Ser. No. 14/696,202 filed on Apr. 24, 2015, entitled ROBUST FEATURE IDENTIFICATION FOR IMAGE-BASED OBJECT RECOGNITION. The entire contents of that application are hereby incorporated by reference herein.

Figure 3:
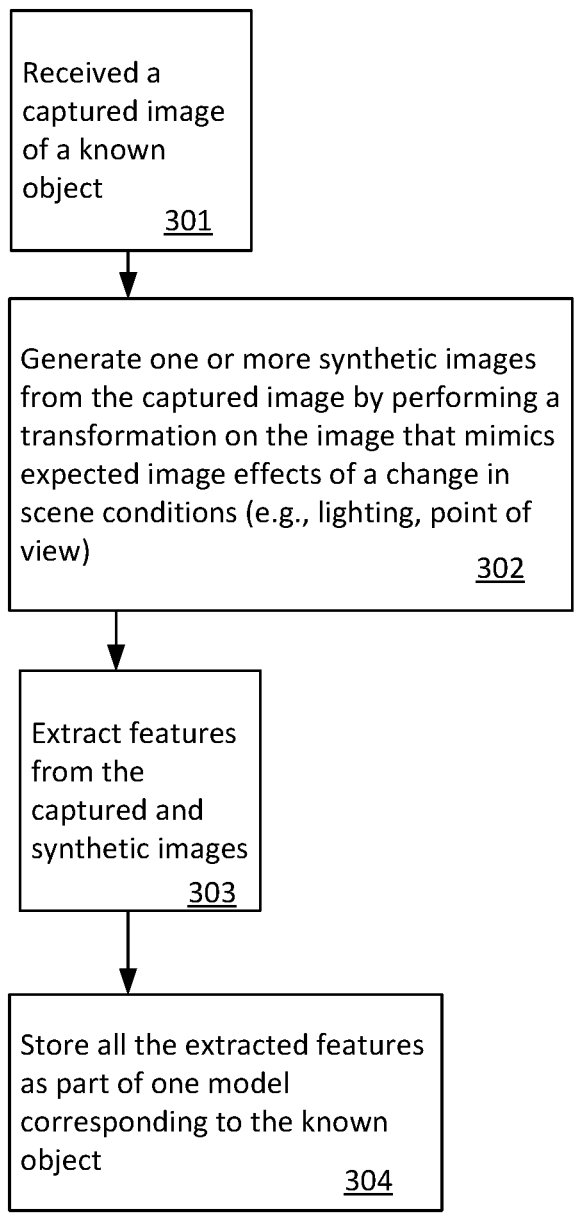
FIG. 3 illustrates a process in accordance with an embodiment of the invention carried out by a feature combining device working in combination with one or more image capture devices and an object recognition system.

FIG. 3 illustrates a process 300 carried out by feature combining device 110 working in combination with one or more image capture devices 101 and object recognition system 120. Step 301 receives a first document image which, in some embodiments is a captured image of a known object or, in other embodiments, is another type of image—e.g., as previously described—of a known object. Step 302 generates one or more second document images of the known object by generating one or more synthetic images from the first document image. The one or more second images are synthetically generated to replicate predicted variations in expect image capture conditions. Step 303 extracts image features from the first document image (e.g., a captured image) and from the one or more synthetically generated second document images. Step 304 stores the features from the first document image and the one or more synthetically generated images as part of a common model corresponding to the known object in the document images.

As noted above, this technique can be used to add robustness to an object model in an image recognition database even when images of a known object have not yet been captured under a variety of conditions. This can be particularly useful in a variety of specific applications. The context of conducting recognition searches for medical images has already been discussed. As another example, any activity in time sensitive and/or uncontrolled or rapidly changing contexts might benefit from this technology. For example, in search/rescue operations, rescuers might have an image of a known person or other known object, the image having been captured under a specified set of conditions. However, real time images of an object that might or might not be the same object could have been captured under very different conditions. The previously captured image of the known object used to populated the object model in the searchable database can be synthetically altered to generate a second image that replicates imaging the known object under various other conditions, e.g., different lighting conditions, background conditions, or weather conditions. Other factors that might have affected the object itself can also be replicated through one or more synthetic image generation processes replicating, for example, decay, aging, water damage, fire damage, oxidation, or other changes to the object. Features from the one or more synthetically generated images can be used to make the model of the known object more robust and allow users to more effectively determine if a particular query image corresponds to the known object.

Application of various algorithms can also be leveraged for different security-related applications. Such variations can include applying a blurring filter that would render an object in the document image in a blurred (e.g., Gaussian blur, etc.) manner similar to what might be observed in a frame of a video. Further, the document image can be down-sampled to simulate a grainy image effect. Such techniques could be used in surveillance-related applications to track moving vehicles, moving people, track wild life, or track other items in motion.

Such variations can allow improved recognitions in various other context including family photo analysis, social media recognition, and traffic analysis. Also, the technology can potentially be used in contexts involving high dynamic range rendering (HDR). For example, an image of a known object captured without HDR might be used to synthetically emulate HDR images of the object under various conditions which in turn can build an object model to be used in recognizing HDR query images that might, for example, be generated in video games or other contexts. In reverse, an HDR image of a known object might be used to synthetically generate several non-HDR images of the object under a variety of condition and then used for populating a model of the object in a database that can be searched using non-HDR query images. Still further, variations can include applying one or more artistic filters such as those found in image editing software (e.g., PhotoShop®, GIMP, etc.) to the document image to create the synthetic images. Example artistic filters can include texture filters (e.g., canvas effects, weave effects, etc.), cartoon effects, cubism effects, impressionist effects, glass tile effects, oil painting effects, photocopy effects, media type effects (e.g., color pencils, pastels, watercolor, etc.), relief effects, and so on. Such techniques are considered useful when attempting to recognize objects that might be imaged through extreme circumstances, for example, through a glass tile window or copyrighted images that have been extremely altered.

Figure 4:
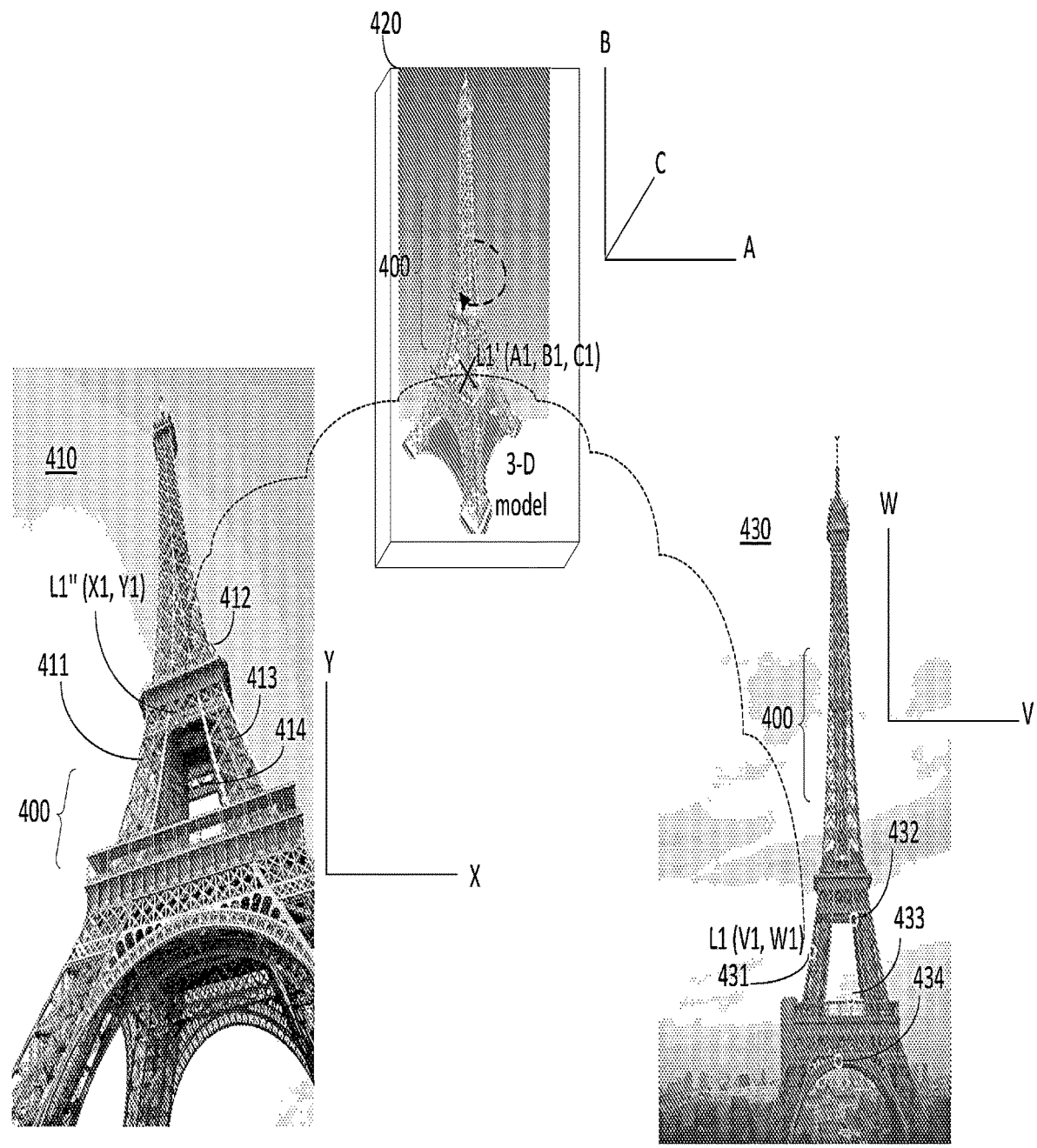
FIG. 4 conceptually illustrates a different feature combining process in accordance with an embodiment of the invention for combining features from two independently captured (or independently generated) images of the same known object.

FIG. 4 conceptually illustrates a different feature combining process for combining features from two independently captured (or independently generated) images of the same known object 400 (in this example, the Eiffel Tower). First document image 410 is captured independently of second document image 430. Known techniques can be applied to identify potentially distinguishing features of interest in each image. Such features are expected to be useful in distinguishing images of object 400 from images of other objects. For illustrative purposes only, a few such features are identified in image 410 including, for example, features 411, 412, 414. A few such features are also identified in image 430 including features 431, 432, and 433. Using known algorithms previously discussed, feature descriptors can be calculated and stored for purposes of an image-based object recognition search.

Locations of such features within the image can also be stored along with the descriptor. Locations can be stored with respect to a particular pixel coordinate reference. Independently captured (or independently generated) images will typically have independent pixel coordinate reference systems. This is symbolically referenced by the "X-Y" coordinates shown next to image 410 and the "V-W" coordinates shown next to image 430.

In an embodiment of the present invention, locations of features of a second independent image of a known object are expressed in the same coordinate system used to express features in a first independent image. And the features for both independent images are combined and stored as part of a common model for the object. The appropriate location in the first image's coordinate system for a feature located in a second image is obtained through a geometric transformation using a 3-D model. In the illustrated example, 3-D model 420 represents object 400 (the Eiffel Tower) in 3-D coordinates A-B-C. Locations in image 430, expressed in coordinates V-W can be projected, using known techniques, into a location in 3-D model 420, expressed in coordinates A-B-C. Then, the location in 3-D model 420 expressed using coordinates A-B-C can be projected, using known techniques, into a location in image 410, expressed in coordinates X-Y. For example, in image 430, feature 431 has a location L1 expressed in coordinates V-W as (V1, W1). When location L1 is projected into 3-D model 420, it has a location in that model of L1', which can be expressed in coordinates A-B-C as (A1, B1, C1). Then, when location L1' in 3-D model 420 is projected into image 410, it has a location in image 410 of L'', which can be expressed in coordinates X-Y as X1, Y1. In this manner, locations of features in a plurality of independent images of the same known object can be expressed in a single coordinate system, in this example, the X-Y coordinate system of image 410. Thus, when a descriptor for feature 431 in image 430 is calculated, it is stored with the location X1, Y1 in coordinate system X-Y. Features from both image 410 and 430 are stored in that manner, using image 410 coordinates, as part of a common model of object 400 in object recognition database 121 for us by object recognition system 120. Feature locations corresponding to locations in any number of other additional independent images of object 400 can be transformed into the X-Y coordinates of image 410 by following a similar process of (1) projecting the location for a feature in the additional independent image into a location in 3-D model 420 expressed in A-B-C coordinates and then (2) projecting that 3-D location in model 420 to a location in image 410, expressed in the X-Y coordinates of image 410.

Figure 5:
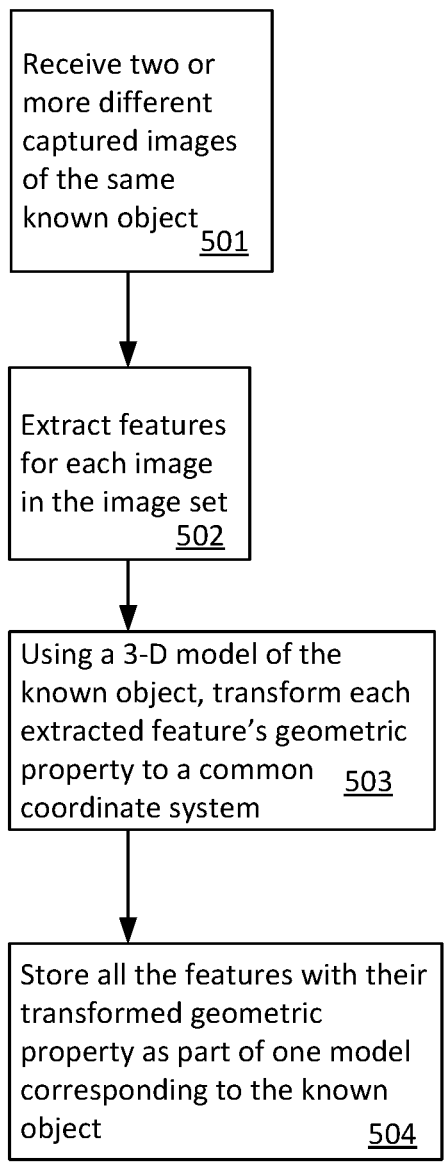
FIG. 5 illustrates a process in accordance with an embodiment of the invention carried out by a feature combining device working in combination with one or more image capture devices and an object recognition system.

FIG. 5 illustrates a process 500 carried out by feature combining device 110 working in combination with one or more image capture devices 101 and object recognition system 120. Process 500 implements the combination of features from two or more independently captured images of the same known object by transforming feature locations from a coordinate system of a second image into a location expressed in the coordinate system of a first image (as conceptually illustrated in FIG. 4). Step 501 receives two or more independently captured or generated images of the same known object. Step 502 identifies distinguishing features (for which descriptors can be calculated) in each image. Corresponding locations for each feature are also determined. Step 503 uses a 3-D model of the known object to transform the location of a feature in a second one of the independent images into a location in the coordinate system of a first one of the independent images. For example, if there are first, second, and third images of the same known object, and locations of features in the first, second, and third images are expressed in first, second, and third coordinate systems, then feature locations in the second image are transformed into locations in the first image's coordinate system using the 3-D model. Similarly, feature locations in the third image are also transformed into locations in the first image's coordinate system using the 3-D model. Step 504 stores all the features (or, more accurately, calculated descriptors of those features) from the multiple independent images—along with the feature locations expressed in a common coordinate system—as part of a common model for the know object. This method can be applied to combine features from any number of independently captured (or generated) images of the same known object.

Method 300 of FIG. 3 and method 500 of FIG. 5 can be used independently of the other or can be used together. In other words, some embodiments of the invention can use method 300 to combine features from a first image with features of one or more second images, the one or more second images being synthetically generated from the first image. Other embodiments of the invention can use method 500 to combine features from independently captured images of the same known object by transforming feature locations to a common coordinate system. And yet other embodiments can use both methods in building a common model for the same known object to be stored and used for imaged-based object recognition. For example, a model might include feature descriptors from five different images: image1, image2, image3, image4, and image5 of the same known object. Image 1, image2, and image3 might be captured (or generated) independently of each other. Features from image2 and image3 could be combined with features of image1 using method 500 to transform feature locations from those images into feature locations expressed in terms of locations in a coordinate system corresponding to image 1. However, image4 and image5 might be synthetically generated from image1 and the locations of features in those images would already be expressed in the coordinate system of image1. Features from all five images can be stored as part of the same object model using a combination of method 300 and method 500. Of particular note, it should be appreciated that not all algorithms commute such that application of a first algorithm and then a second algorithm would generate the same set of descriptors as applying the algorithms in reverse order. Therefore, some embodiments of the inventive subject matter is also considered to include applying two or more algorithms to generate synthetic images according to a specific order.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 3 and/or FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
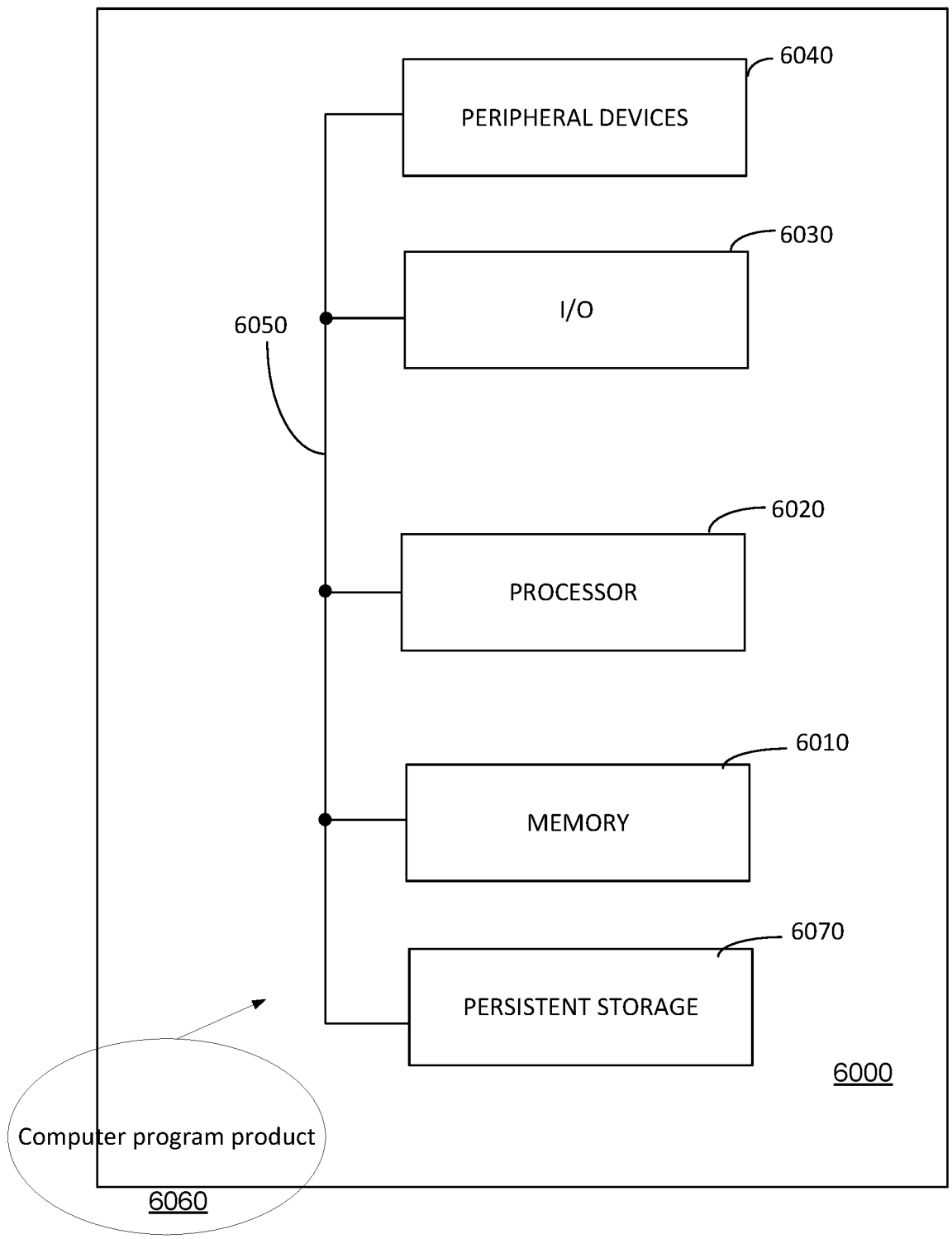
FIG. 6 shows an example of a computer system that may be used to execute instruction code contained in a computer program product in accordance with an embodiment of the present invention.

FIG. 6 shows an example of a computer system 6000 (one or more of which may provide one or more the components of network 1000 of FIG. 1, including feature combining device 110, image capture devices 101, image capture devices 102, and/or object recognition system 120) that may be used to execute instruction code contained in a computer program product 6060 in accordance with an embodiment of the present invention. Computer program product 6060 comprises executable code in an electronically readable medium that may instruct one or more computers such as computer system 6000 to perform processing that accomplishes the exemplary method steps performed by the embodiments referenced herein. The electronically readable medium may be any non-transitory medium that stores information electronically and may be accessed locally or remotely, for example via a network connection. In alternative embodiments, the medium may be transitory. The medium may include a plurality of geographically dispersed media each configured to store different parts of the executable code at different locations and/or at different times. The executable instruction code in an electronically readable medium directs the illustrated computer system 6000 to carry out various exemplary tasks described herein. The executable code for directing the carrying out of tasks described herein would be typically realized in software. However, it will be appreciated by those skilled in the art, that computers or other electronic devices might utilize code realized in hardware to perform many or all of the identified tasks without departing from the present invention. Those skilled in the art will understand that many variations on executable code may be found that implement exemplary methods within the spirit and the scope of the present invention.

The code or a copy of the code contained in computer program product 6060 may reside in one or more storage persistent media (not separately shown) communicatively coupled to system 6000 for loading and storage in persistent storage device 6070 and/or memory 6010 for execution by processor 6020. Computer system 6000 also includes I/O subsystem 6030 and peripheral devices 6040. I/O subsystem 6030, peripheral devices 6040, processor 6020, memory 6010, and persistent storage device 6060 are coupled via bus 6050. Like persistent storage device 6070 and any other persistent storage that might contain computer program product 6060, memory 6010 is a non-transitory media (even if implemented as a typical volatile computer memory device). Moreover, those skilled in the art will appreciate that in addition to storing computer program product 6060 for carrying out processing described herein, memory 6010 and/or persistent storage device 6060 may be configured to store the various data elements referenced and illustrated herein.

Those skilled in the art will appreciate computer system 6000 illustrates just one example of a system in which a computer program product in accordance with an embodiment of the present invention may be implemented. To cite but one example of an alternative embodiment, execution of instructions contained in a computer program product in accordance with an embodiment of the present invention may be distributed over multiple computers, such as, for example, over the computers of a distributed computing network.

One skilled in the art will recognize that an implementation of an actual computer or computer system may have other structures and may contain other components as well, and that FIG. 6 is a high level representation of some of the components of such a computer for illustrative purposes.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a," "an," and "the" includes plural references, and the meaning of "in" includes "in" and "on."

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human. Although, in some embodiments, the digital data represents images, it should be appreciated that the digital data is a representation of one or more digital models of images, not necessarily the images themselves. By instantiation of such digital models in the memory of the computing devices, the computing devices are able to manage the digital data or models in a manner that could provide utility to a user of the computing device that the user would lack without such a tool. Thus, the disclosed devices are able to process such digital data in a more efficient manner according to the disclosed techniques.

One should appreciate that the disclosed techniques provide many advantageous technical effects including improving the scope, accuracy, compactness, efficiency and speed of digital image-based object recognition and retrieval technologies. It should also be appreciated that the following specification is not intended as an extensive overview, and as such, concepts may be simplified in the interests of clarity and brevity.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of generating combined image feature sets stored in a computerized image recognition database configured for use in a computerized object recognition search of objects in images, the method comprising:

at a feature combining device, performing a geometric transformation on at least one of a first set of image features and a second set of image features to obtain feature locations expressed in a common coordinate system for each feature in the first set of image features and the second set of image features wherein the first set of image features is derived from a first image of an object and the second set of image features is derived from a second image of the object, the first image corresponding to a first object view and the second image corresponding to a second object view different from the first object view, the first image and the second image being independently captured or synthetically generated;

at the feature combining device, designating a combined feature set comprising the first set of image features and the second set of image features with feature locations expressed in the common coordinate system; and associating, for storage in the computerized image recognition database, the combined feature set with an identifier of the object.

2. The method of claim 1, wherein the first set of image features and the second set of image features are obtained from, respectively, the first image and the second image using a feature detection algorithm.

3. The method of claim 1, wherein the feature detection algorithm includes at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

4. The method of claim 1, wherein the feature combining device comprises one or more generating computers and one or more deriving computers.

5. The method of claim 4, wherein the one or more deriving computers, the one or more generating computers, and the feature combining device are a single computer.

6. A system for generating image feature combinations stored in a computerized image recognition database configured for use in a computerized object recognition system for recognizing objects in images, the system comprising:
 a feature combining device configured to:
  perform a geometric transformation on at least one of a first set of image features and a second set of image features to obtain feature locations expressed in a common coordinate system for each feature in the first set of image features and the second set of image features wherein the first set of image features is derived from a first image of an object and the second set of image features is derived from a second image of the object, the first image corresponding to a first object view and the second image corresponding to a second object view different from the first object view, the first image and the second image being independently captured or synthetically generated;
  designate a combined feature set comprising the first set of image features and the second set of image features with feature locations expressed in the common coordinate system; and
  associate, for storage in the computerized image recognition database, the combined feature set with an identifier of the object.

7. The system of claim 6, wherein the first set of image features and the second set of image features are obtained from, respectively, the first image and the second image using a feature detection algorithm.

8. The system of claim 6, wherein the feature detection algorithm includes at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

9. The system of claim 6, wherein the feature combining device comprises one or more generating computers and one or more deriving computers.

10. The system of claim 9, wherein the one or more deriving computers, the one or more generating computers, and the feature combining device are a single computer.

11. A non-transitory computer-readable medium having instructions stored thereon, which, when executed by at least one processor, cause the at least one processor to perform one or more steps comprising:
 at a feature combining device, performing a geometric transformation on at least one of a first set of image features and a second set of image features to obtain feature locations expressed in a common coordinate system for each feature in the first set of image features and the second set of image features wherein the first set of image features is derived from a first image of an object and the second set of image features is derived from a second image of the object, the first image corresponding to a first object view and the second image corresponding to a second object view different from the first object view, the first image and the second image being independently captured or synthetically generated;
 at the feature combining device, designating a combined feature set comprising the first set of image features and the second set of image features with feature locations expressed in the common coordinate system; and
 associating, for storage in the computerized image recognition database, the combined feature set with an identifier of the object.

12. The computer-readable medium of claim 11, wherein the first set of image features and the second set of image features are obtained from, respectively, the first image and the second image using a feature detection algorithm.

13. The computer-readable medium of claim 11, wherein the feature detection algorithm includes at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

14. The computer-readable medium of claim 11, wherein the feature combining device comprises one or more generating computers and one or more deriving computers.

15. The computer-readable medium of claim 14, wherein the one or more deriving computers, the one or more generating computers, and the feature combining device are a single computer.

\* \* \* \* \*